(No Model.) 3 Sheets—Sheet 1.

F. G. MYERS.
MACHINE FOR MANUFACTURING ROCK DRILL BITS, &c.

No. 583,811. Patented June 1, 1897.

Witnesses:
Hamilton D. Turner
Murray C. Boyer

Inventor:
Frederick G. Myers
by his Attorneys
Howson & Howson (No Model.) 3 Sheets—Sheet 2.

F. G. MYERS.
MACHINE FOR MANUFACTURING ROCK DRILL BITS, &c.

No. 583,811. Patented June 1, 1897.

Witnesses

Inventor
Frederick G. Myers
by his Attorneys
Howson & Howson (No Model.) 3 Sheets—Sheet 3.
F. G. MYERS.
MACHINE FOR MANUFACTURING ROCK DRILL BITS, &c.
No. 583,811. Patented June 1, 1897.
FIG. 6. FIG. 4.
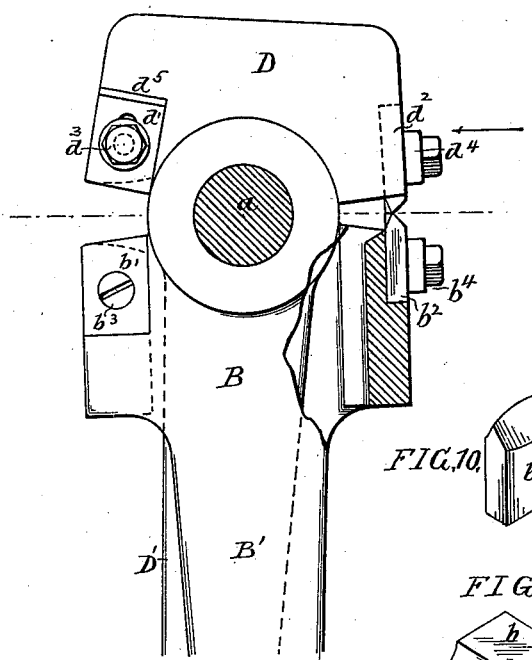
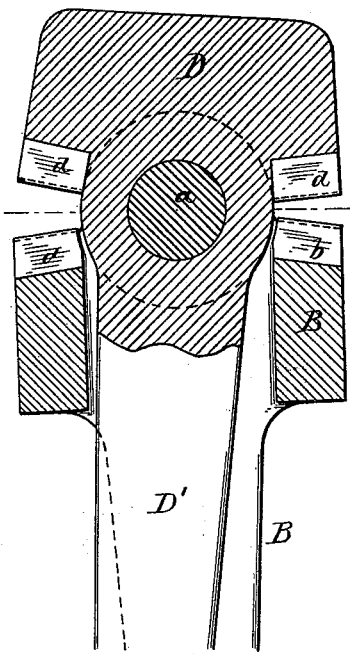
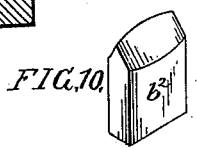
FIG. 10.
FIG. 8.
FIG. 5. FIG. 7.
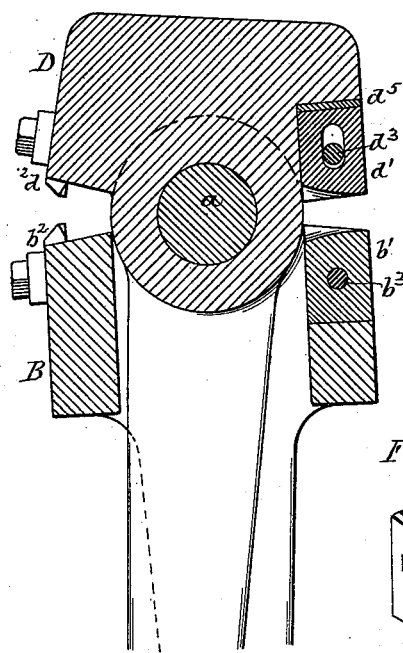
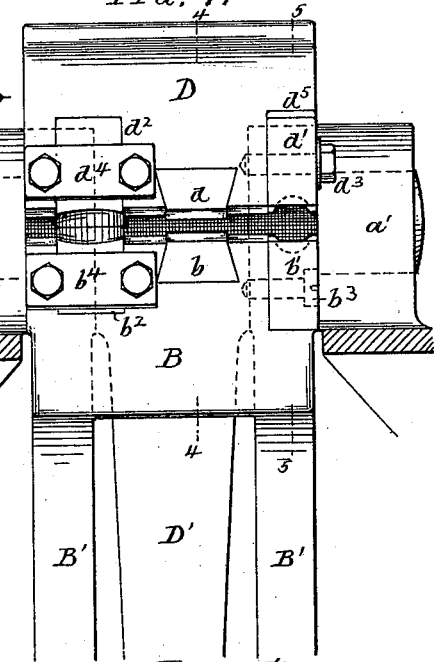
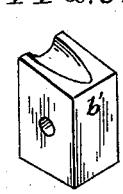
FIG. 9.
Witnesses:
Hamilton D. Turner
Murray C. Boyer
Inventor
Frederick G. Myers
by his Attorneys
Howson & Howson
THE NORRIS PETERS CO., PHOTO-LITHO., WASHINGTON, D. C.

UNITED STATES PATENT OFFICE.

FREDERICK GEORGE MYERS, OF PHILADELPHIA, PENNSYLVANIA.

MACHINE FOR MANUFACTURING ROCK-DRILL BITS, &c.

SPECIFICATION forming part of Letters Patent No. 583,811, dated June 1, 1897.

Application filed December 24, 1896. Serial No. 616,883. (No model.) Patented in South African Republic May 19, 1896, No. 1,122.

*To all whom it may concern:*

Be it known that I, FREDERICK GEORGE MYERS, a citizen of the United States, residing in Philadelphia, Pennsylvania, have invented certain Improvements in Machines for Manufacturing Rock-Drill Bits, &c., (for which I have obtained Letters Patent in South African Republic, No. 1,122, dated May 19, 1896,) of which the following is a specification.

My invention relates to certain improvements in machines for forging and sharpening drill-bits or other tools of a like nature.

My invention is especially adapted to forging and sharpening rock-drilling bits known as "chisel-bits."

The object of my invention is to so construct the machine that the bit can be shaped and sharpened in one heat, and I so construct the machine that two bits can be shaped and sharpened simultaneously, although it will be understood that a single machine can be designed when necessary.

The process of forging and sharpening a rock-drill bit consists in heating a bar of steel, flattening it by forging to give it the proper taper and spread, and then forging it upon end to size and to give the edges the curve required. Then in order to sharpen the edge the uneven end is cut off on a bevel and preferably on a curved line. After the bit is sharpened it is hardened in the ordinary manner. To resharpen drill-bits, they are first heated, then upset, forged into shape, and the extreme end cut off. This process can be repeated until the bit is too short for practical use.

Prior to my invention the sharpening of rock-drill bits was very slow and tedious and the bits produced were not uniform, although made by skilled labor; but by my invention the bits can be rapidly and accurately made and without skilled labor.

Figure 12:
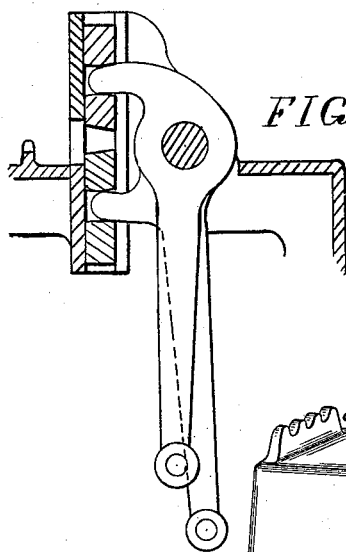
Figure 1:
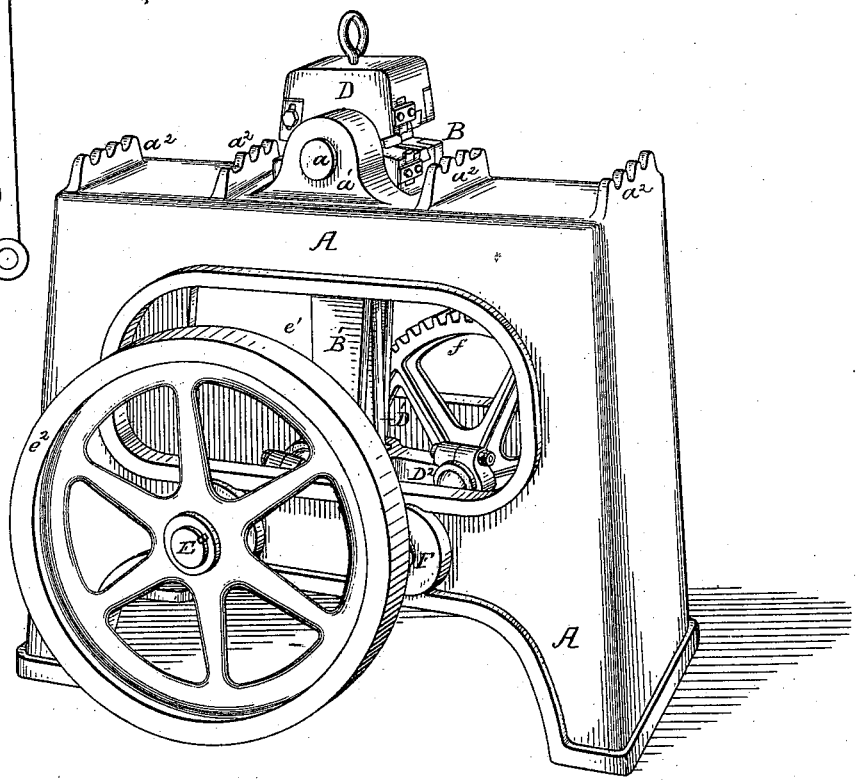
Figure 11:
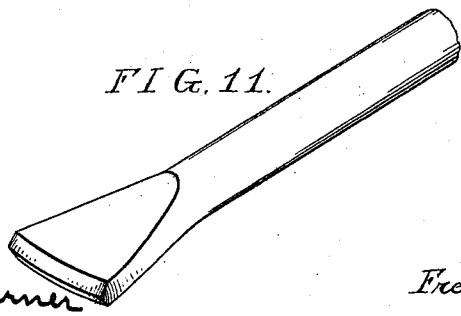
Figure 2:
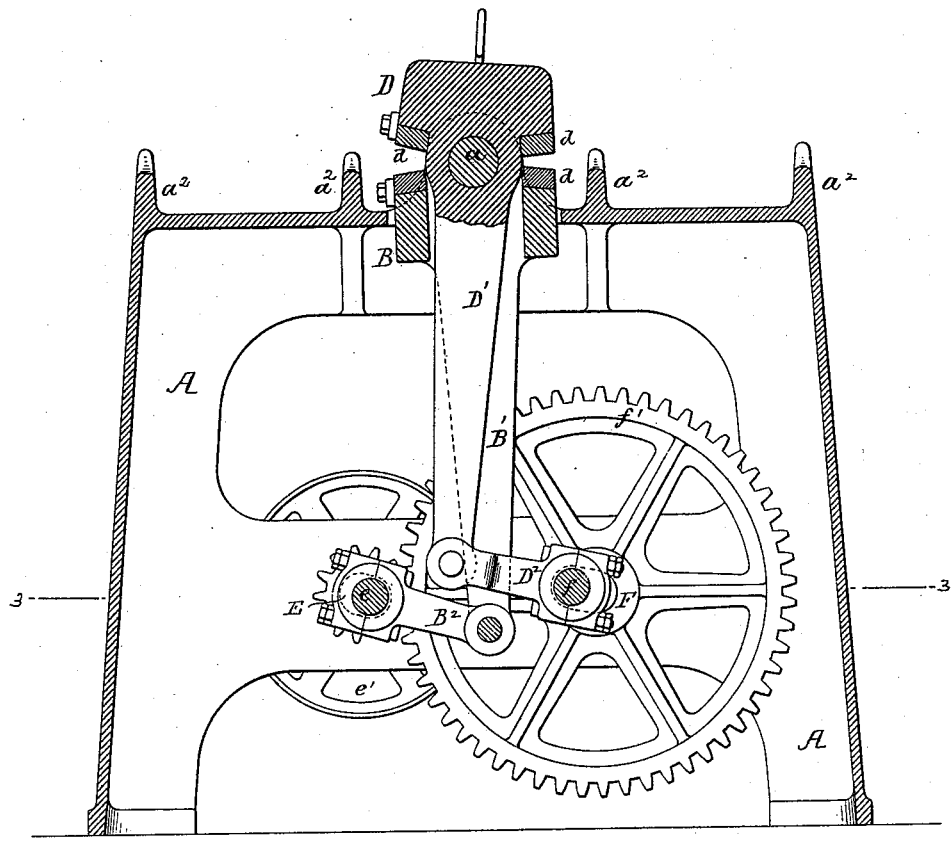
Figure 3:
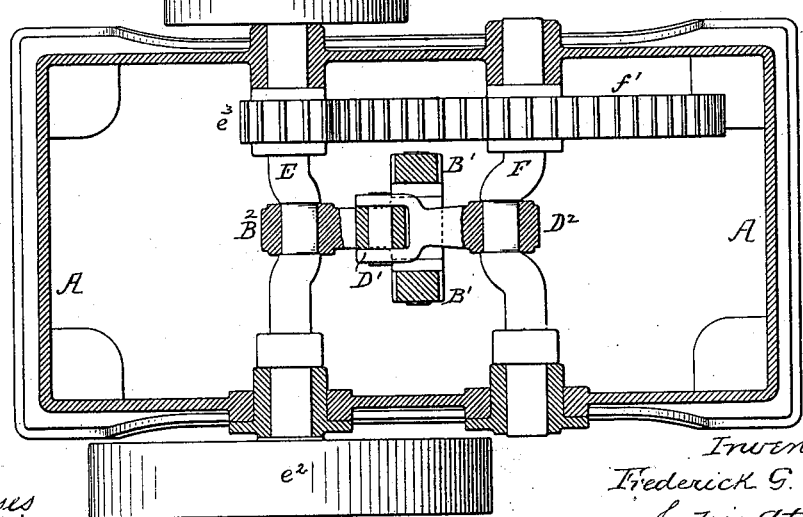

In the accompanying drawings, Figure 1 is a perspective view of my improved machine for forging and sharpening drill-bits. Fig. 2 is a longitudinal sectional view. Fig. 3 is a sectional plan view on the line 3 3, Fig. 2. Fig. 4 is a section on the line 4 4, Fig. 7. Fig. 5 is a section on the line 5 5, Fig. 7. Fig. 6 is a side view, partly in section, looking in the direction of the arrow, Fig. 7. Fig. 7 is a view looking in the direction of the arrow, Fig. 6. Fig. 8 is a perspective view of one of the flattening-dies. Fig. 9 is a perspective view of one of the edging-dies. Fig. 10 is a perspective view of one of the cutters. Fig. 11 is a perspective view of a chisel-bit used in rock-drilling, and Fig. 12 is a view of a modification.

A is the frame of the machine, having bearings $a'$ $a'$ for the pivot-pin $a$, on which rock the two jaws B and D. The jaw B is the lower jaw, and D is the upper jaw. The lower jaw B has two arms B', which are coupled to a connecting-rod B², which in turn is coupled to the crank $e$ of the driving-shaft E. On this driving-shaft is a belt-pulley $e'$ and a fly-wheel $e^2$.

The jaw D has a single arm D', which extends through the lower jaw and is coupled to a connecting-rod D², which is in turn coupled to the crank $f$ of a shaft F. This shaft is driven from the driving-shaft E through the pinion $e^3$ and gear-wheel $f'$.

It will be noticed on referring to Figs. 2 and 3 that the throw of the crank $f$ is greater than the throw of the crank $e$, so that the movement of the jaw B is much more limited than the movement of the jaw D, and owing to the method of gearing the movement of the jaw B is much more rapid than the jaw D. The object of this construction is to make the jaw B the forging-jaw, while the jaw D acts as the anvil, so that if a tool is to be made from a bar it can be gradually pressed into the space between the jaws without having to wait for the jaws to open to the full extent, thus it does not require a skilled mechanic to shape the bar into the form of a chisel-bit. The jaws, however, are so timed that when the end of the bar is to be cut off the two cutters will come together and properly sever the bar.

In the present instance each jaw has two sets of forging and cutting tools. In the lower jaw B is the die $b$, Fig. 8, for flattening the bar to the proper taper. This die is dovetailed in shape and is adapted to a dovetailed recess in the lower jaw.

One side of the jaw is recessed, and adapted to this recess is the edging-die $b'$. This edging-die, as shown in Fig. 9, has a curved face of a radius less than the diameter of the bit, so that it will not only properly size and flare the bit, but it will round it on a radius less than the hole to be drilled. This lower die $b'$ is held to the head by a countersunk screw. On the opposite end of the head is a cutter $b^2$ of the form shown in Fig. 10. The cutting-edge of this tool is curved so as to round the end of the bit, so that the bit will center itself in drilling the hole. The cutter is adapted to a recess in the jaw B and is secured therein by a clamp-plate $b^4$ and bolts which are tapped into the jaw.

In the upper jaw D is the flattening-die $d$ directly above the flattening-die $b$ of the lower jaw, and adapted to a recess at one end of the jaw D is an edging-die $d'$, which is a counterpart of the edging-die $b'$ of the lower jaw, with the exception that it is slotted, and adapted to this slot is a confining-screw $d^3$, which is tapped into the jaw.

Mounted between the end of the die and the head is a filling-plate $d^5$. When it is wished to adjust this die, the plate can be removed and another plate substituted for it, after which the confining-screw $d^3$ can be screwed up to secure the die firmly in position.

$d^2$ is the cutter similar to the cutter $b^2$ and confined in the recess in the jaw D by the plate $d^4$ and its bolts.

The dies and cutters are duplicated on the opposite side of the machine, so that two drills can be formed and sharpened at the same time.

It will be understood that the dies and cutters may be attached to the jaw in a manner different from that shown without departing from my invention, and the dies and cutters can be shaped to correspond with the drill-bit to be formed, and, as remarked above, the machine can be used to form and sharpen other edged tools, and the jaws may be operated in any suitable manner without departing from my invention, and may be made to reciprocate toward and from each other in a straight line and at different speeds, as shown in Fig. 12.

On the upper portion of the table A are ribs $a^2$, recessed in line with the dies and cutters, so that the stock of the drill-bit will be held in proper position during the forming or cutting, and I provide an eye on the upper jaw D, to which lifting-tackle can be attached when it is required to remove the jaw from the machine.

I claim as my invention—

1. In a machine for forming edge-tools, the combination of the two jaws movable from and toward each other, with provision for moving one of said jaws at a slow speed and the other at a higher speed, substantially as described.

2. In a machine for forming edge-tools, the combination of the two jaws movable from and toward each other, with provision for imparting to one of said jaws a limited movement and to the other a more extended movement, substantially as described.

3. In a machine for forging edge-tools the combination of two jaws between which the tool is to be formed, means for moving the jaws at different speeds, one jaw having a greater throw than the other, substantially as described.

4. In a machine for forming edge-tools, the combination of the two jaws movable from and toward each other, with provision for giving to one of said jaws a short, quick movement and to the other a slower and more extended movement, substantially as described.

5. The combination of two jaws, a pivot on which the two jaws are mounted, arms extending from each jaw, means for operating said arms, dies on each side of each jaw so that two tools can be formed simultaneously, substantially as described.

6. The combination of the frame, the pivot and upper and lower jaws mounted on said pivot, arms extending from the said jaws, one arm being longer than the other, two crank-shafts, one crank-shaft being connected to one arm and the other crank-shaft being connected to the other arm, the two shafts being geared together so that one shaft will revolve at a greater speed than the other, substantially as described.

7. The combination in a machine for forming chisel-bits for rock-drilling, of the frame, the pivot, the upper and lower jaws having arms, mechanism coupled to the said arms to operate the jaws, each jaw having a flattening-die for forming the taper to the bit, a recessed die for sizing and edging the bit and a curved cutter for forming a beveled edge on the end of the bit, substantially as described.

8. The combination of a frame, the pivots, a lower jaw mounted on the pivot and open in the center and having two arms, an upper jaw having a single arm adapted to pass through the opening in the lower jaw and between its arms, the arm of the upper jaw being shorter than the arms of the lower jaw, two crank-shafts geared together, one shaft being connected to the arms of the lower jaw, and the other shaft being connected to the arm of the upper jaw, substantially as described.

In testimony whereof I have signed my name to this specification in the presence of two subscribing witnesses.

FREDERICK GEORGE MYERS.

Witnesses:
WILL A. BARR,
JOS. H. KLEIN.